(12) United States Patent
Foege et al.

(10) Patent No.: US 9,193,362 B2
(45) Date of Patent: Nov. 24, 2015

(54) CONSIST POWER SYSTEM HAVING AUXILIARY LOAD MANAGEMENT

(71) Applicant: Electro-Motive Diesel, Inc., Lagrange, IL (US)

(72) Inventors: Aaron Gamache Foege, Westmont, IL (US); Dana Ray Coldren, Secor, IL (US)

(73) Assignee: Electro-Motive Diesel, Inc., LaGrange, IL (US)

( * ) Notice: Subject to any disclaimer, the term of this patent is extended or adjusted under 35 U.S.C. 154(b) by 142 days.

(21) Appl. No.: 13/895,418

(22) Filed: May 16, 2013

(65) Prior Publication Data
US 2014/0033945 A1    Feb. 6, 2014

Related U.S. Application Data

(60) Provisional application No. 61/677,770, filed on Jul. 31, 2012.

(51) Int. Cl.
*B61C 11/00* (2006.01)
*B60L 13/00* (2006.01)
*B61C 7/04* (2006.01)
*B61C 17/02* (2006.01)

(52) U.S. Cl.
CPC . *B61C 7/04* (2013.01); *B61C 17/02* (2013.01); *Y02T 30/16* (2013.01)

(58) Field of Classification Search
CPC ............. B60L 7/00; B60L 7/02; B60L 7/10; B60L 7/20; B60L 11/00; B60L 11/02; B60L 11/12; B60L 11/18; B61C 3/00; B61C 3/02; B61C 11/00

USPC ............ 105/26.05, 27, 34.1–35, 49–53; 104/287–289

See application file for complete search history.

(56) References Cited

U.S. PATENT DOCUMENTS

| | | |
|---|---|---|
| 308,948 A | 12/1884 | Bruce |
| 331,716 A | 12/1885 | Katz |
| 338,028 A | 3/1886 | Bower |
| 3,352,294 A | 11/1967 | Biller et al. |
| 4,137,006 A | 1/1979 | Becker |
| 4,551,065 A | 11/1985 | Becker |
| 4,630,572 A | 12/1986 | Evans |
| 4,646,701 A | 3/1987 | Fukumoto |
| 5,129,328 A | 7/1992 | Donnelly |
| 5,269,225 A | 12/1993 | Bosshart et al. |

(Continued)

FOREIGN PATENT DOCUMENTS

| | | |
|---|---|---|
| CH | 1 261 237 | 3/1969 |
| DE | 102009042256 | 4/2011 |

(Continued)

*Primary Examiner* — R. J. McCarry, Jr.
(74) *Attorney, Agent, or Firm* — Finnegan, Henderson, Farabow, Garrett & Dunner, LLP

(57) ABSTRACT

The disclosure is directed to a power system for a consist. The power system may have a main engine located onboard a locomotive of the consist, a main generator driven by the main engine to generate a main supply of electric power, and a traction motor configured to receive the main supply of electric power and propel the locomotive. The power system may also have an auxiliary engine located on a tender car towed by the locomotive, and an auxiliary generator driven by the auxiliary engine to generate an auxiliary supply of power directed to the locomotive.

19 Claims, 4 Drawing Sheets

(56) References Cited

U.S. PATENT DOCUMENTS

| | | |
|---|---|---|
| 5,375,580 A | 12/1994 | Stolz et al. |
| 5,544,483 A | 8/1996 | Heuer |
| 5,567,105 A | 10/1996 | Williams |
| B609,141 I5 | 3/1997 | Matsuoka et al. |
| 5,692,458 A | 12/1997 | Green |
| 5,887,567 A | 3/1999 | White et al. |
| 6,408,766 B1 | 6/2002 | McLaughlin et al. |
| 6,460,517 B1 | 10/2002 | Dauer |
| 6,506,018 B1 | 1/2003 | Brennan |
| 6,698,211 B2 | 3/2004 | Gustafson |
| 6,898,940 B2 | 5/2005 | Gram et al. |
| 6,907,735 B2 | 6/2005 | Wolff et al. |
| 7,304,445 B2 | 12/2007 | Donnelly |
| 7,308,889 B2 | 12/2007 | Post et al. |
| 7,373,931 B2 | 5/2008 | Lennox et al. |
| 7,430,967 B2 | 10/2008 | Kumar |
| 7,448,328 B2 | 11/2008 | Kumar |
| 7,631,635 B2 | 12/2009 | Hochstein et al. |
| 7,689,341 B2 | 3/2010 | Miller |
| 8,056,540 B2 | 11/2011 | Debastos et al. |
| 8,079,437 B2 | 12/2011 | Rosman |
| 8,112,191 B2 | 2/2012 | Kumar et al. |
| 2004/0149254 A1 | 8/2004 | Piock |
| 2005/0279242 A1* | 12/2005 | Maier et al. ............... 105/26.05 |
| 2008/0000381 A1 | 1/2008 | Bartley et al. |
| 2008/0083576 A1 | 4/2008 | Read |
| 2008/0121136 A1 | 5/2008 | Mari et al. |
| 2008/0302093 A1 | 12/2008 | Montgomery et al. |
| 2009/0187291 A1 | 7/2009 | Daum et al. |
| 2009/0234521 A1 | 9/2009 | Kumar et al. |
| 2010/0019103 A1 | 1/2010 | Kane et al. |
| 2010/0070117 A1 | 3/2010 | Siffert |
| 2010/0114404 A1 | 5/2010 | Donnelly |
| 2010/0175579 A1 | 7/2010 | Read |
| 2010/0186619 A1* | 7/2010 | Kumar ........................ 104/289 |
| 2011/0061364 A1 | 3/2011 | Raman |
| 2011/0067390 A1 | 3/2011 | Cook |
| 2011/0162903 A1 | 7/2011 | Stragier |
| 2011/0203480 A1 | 8/2011 | Donnelly |
| 2011/0257869 A1 | 10/2011 | Kumar et al. |
| 2012/0085260 A1 | 4/2012 | Nichini et al. |

FOREIGN PATENT DOCUMENTS

| | | |
|---|---|---|
| EP | 0 069 717 | 12/1983 |
| EP | 2 154 044 A2 | 2/2010 |
| EP | 2 154 044 B1 | 1/2012 |
| JP | 56 118533 | 9/1981 |
| JP | 6 033 784 | 2/1994 |
| JP | 2000 136756 | 5/2000 |
| JP | 2007 113442 | 5/2007 |
| JP | 2008 201890 | 9/2008 |
| JP | 2010 023776 | 2/2010 |
| RU | 2009142173 | 5/2011 |
| WO | WO 2008/025158 | 3/2008 |
| WO | WO 2009/021262 | 2/2009 |

* cited by examiner

CONSIST POWER SYSTEM HAVING AUXILIARY LOAD MANAGEMENT

RELATED APPLICATIONS

This application claims the benefit of U.S. Provisional Application No. 61/677,770, filed Jul. 31, 2012, the contents of which are expressly incorporated herein by reference.

TECHNICAL FIELD

The present disclosure relates generally to a consist power system and, more particularly, to a locomotive consist system having auxiliary load management.

BACKGROUND

Natural gas has been used as fuel for internal combustion engines in consist locomotives. Because natural gas has a lower volumetric energy density than traditional fuels, such as diesel and gasoline, the natural gas used by the locomotives is generally only practical to store in a liquefied state ("LNG"). At atmospheric pressures, the natural gas must be chilled to below about −160° C. to remain in liquid form. Consists having LNG-fueled locomotives store the LNG in insulated tank cars (a.k.a., tender cars) that are towed by the locomotive.

A locomotive's main engine drives a generator to produce electricity used to power traction motors that propel the locomotive. The electricity can also be used to power one or more auxiliary loads (e.g., lights, air conditioning, etc.) of the consist. Given the auxiliary loads' dependence on electricity generated by the main engine, the main engine is generally kept operational even when the locomotive is stopped. In this situation, powering the auxiliary loads with the main engine can result in low fuel economy. In addition, powering the auxiliary loads when the locomotive is traveling can reduce a capacity of the main engine to power the traction motors.

One method of improving fuel economy of a consist is described in U.S. Patent Publication No. 2010/0186619 ("the '619 publication") of Kumar that published on Jul. 29, 2010. The '619 publication describes locomotives and rail cars that have the capacity to generate electric power from dynamic braking, to store the power, and to reuse the power at a later time during motoring. The energy can be used to power auxiliary loads, as well as traction motor/propulsion systems, until the energy stores are depleted. This capability may help to improve the fuel economy of a consist.

Although the system of the '619 publication may improve fuel economy to some degree, the amount of improvement may be limited. In particular, the system of the '610 patent may function only for short distances and/or in particular terrain. That is, because the system of the '619 publication uses energy stored from dynamic braking, its energy reservoir may be transitory and dependent on the type of terrain being traversed by the consist. Long stretches of travel across areas that do not require significant dynamic braking could threaten to quickly deplete such an electric energy reserve.

The system of the present disclosure solves one or more of the problems set forth above and/or other problems with existing technologies.

SUMMARY

In one aspect, the disclosure is directed to a consist power system. The consist power system may include a main engine located onboard a locomotive of a consist, a main generator driven by the main engine to generate a main supply of electric power, and a traction motor configured to receive the main supply of electric power and propel the locomotive. The consist power system may also include an auxiliary engine located onboard a tender car towed by the locomotive, and an auxiliary generator driven by the auxiliary engine to generate an auxiliary supply of power directed to the locomotive.

In another aspect, the disclosure is directed to a method of providing power to a consist. The method may include driving a main generator with a main engine located onboard a locomotive of the consist to produce a main supply of electric power, and directing the main supply of electric power to a traction motor configured to propel the locomotive. The method may also include driving an auxiliary generator with an auxiliary engine located onboard a tender car towed by the locomotive to produce a supply of electric power directed to auxiliary loads on the locomotive.

DETAILED DESCRIPTION

Figure 1:
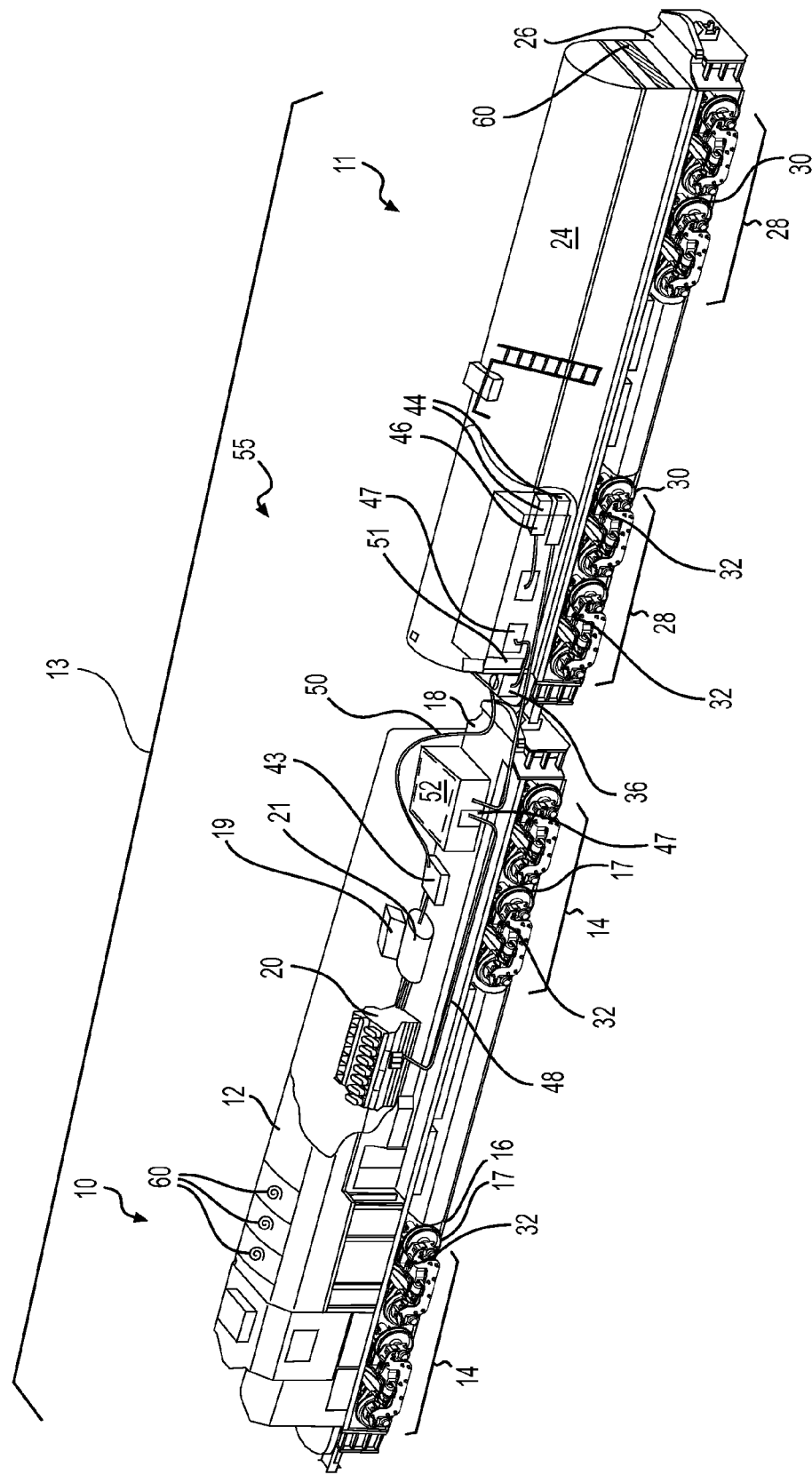
FIG. 1 is a pictorial illustration of an exemplary disclosed auxiliary power system.

FIG. 1 illustrates an exemplary embodiment of a locomotive 10 and a tender car 11 that is towed by locomotive 10. In some embodiments, additional cars may be towed by locomotive 10, for example, a passenger car (not shown), a cargo container car (not shown), or another type of car. Together, locomotive 10, tender car 11 and the other cars connected to them may comprise a consist 13.

Locomotive 10 may include a car body 12 supported at opposing ends by a plurality of trucks 14 (e.g., two trucks 14). Each truck 14 may be configured to engage a track 16 via a plurality of wheels 17, and support a frame 18 of car body 12. Any number of main engines 20 may be mounted to frame 18 and configured to produce electricity that drives wheels 17 included within each truck 14. In the exemplary embodiment shown in FIG. 1, locomotive 10 includes one main engine 20.

Main engine 20 may be a large engine, for example an engine having sixteen cylinders and a rated power output of about 4,000 brake horsepower (bhp). Main engine 20 may be configured to combust a gaseous fuel, such as natural gas, and generate a mechanical output that drives a main generator 21 to produce electric power. The electric power from main generator 21 may be used to propel locomotive 10 via one or more traction motors 32 associated with wheels 17 and, in some instances, directed to one or more auxiliary loads 43 of consist 13 (e.g., lights, heaters, refrigeration devices, air conditioners, fans, etc.). A switch 23 (shown only in FIG. 2) positioned on locomotive 10 may selectively connect main generator 21 to both traction motors 32 and auxiliary loads 43, to only traction motors 32, or to only auxiliary loads 43. Consequently, electric power from main generator 21 may be shared or dedicated solely to propulsion or auxiliary loads, as desired. It should be noted that main engine 20 may have a different number of cylinders, a different rated power output, and/or be capable of combusting another type of fuel, if desired.

Main generator 21 may be an induction generator, a permanent-magnet generator, a synchronous generator, or a switched-reluctance. In one embodiment, main generator 21 may include multiple pairings of poles (not shown), each pairing having three phases arranged on a circumference of a stator (not shown) to produce an alternating current.

Traction motors 32, in addition to providing the propelling force of consist 13 when supplied with electric power, may also function to slow locomotive 10. This process is known in the art as dynamic braking. When a traction motor 32 is not needed to provide motivating force, it can be reconfigured to operate as a generator. As such, traction motors 32 may convert the kinetic energy of consist 13 into electric energy, which has the effect of slowing consist 13. The electric energy generated during dynamic braking is typically transferred to one or more resistance grids 60 mounted on car body 12. At resistance grids 60, the electric energy generated during dynamic braking is converted to heat and dissipated into the atmosphere. Alternatively or additionally, electric energy generated from dynamic braking may be routed to an energy storage system 19 used to selectively provide supplemental power to traction motors 32.

Figure 2:
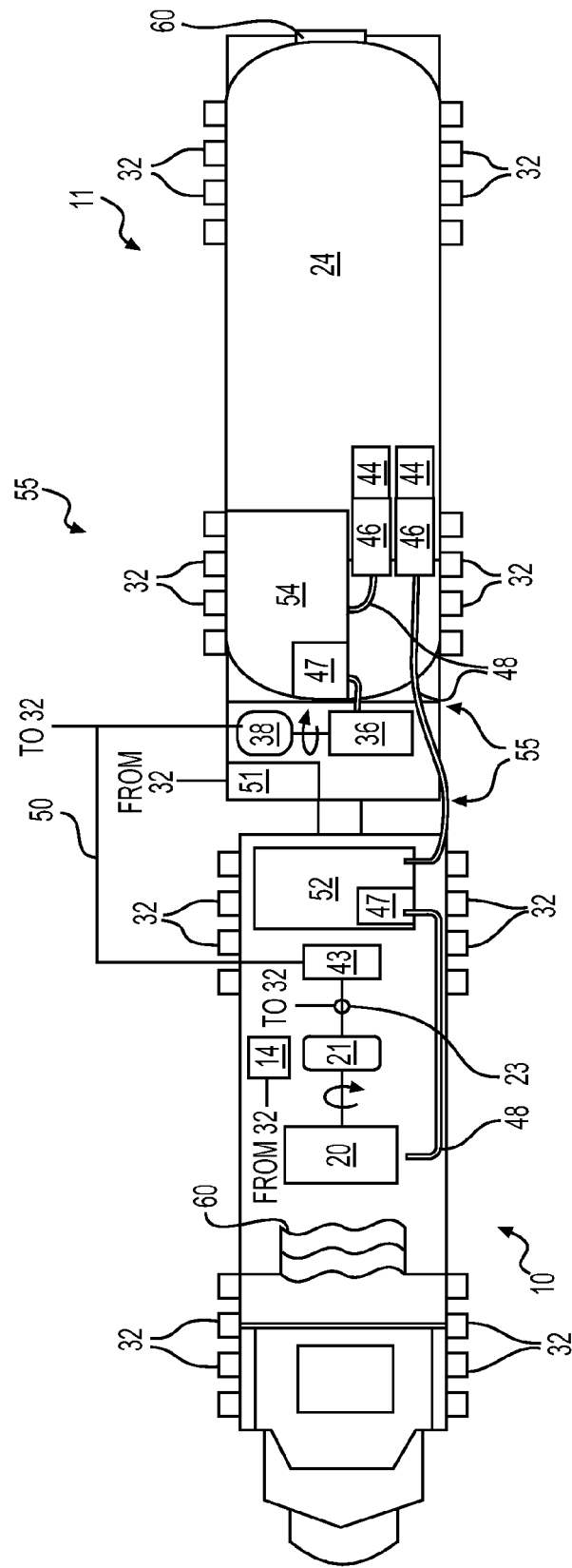
FIG. 2 is a diagrammatic illustration of a top view of the system displayed in FIG. 1.
Figure 3:
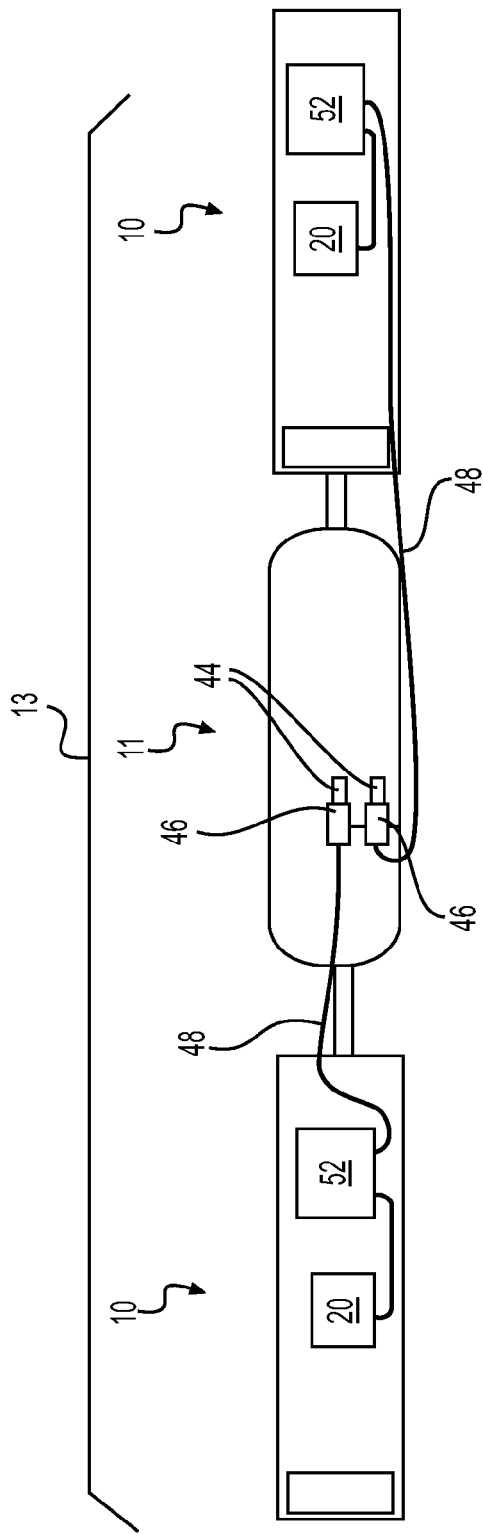
FIG. 3 is a diagrammatic illustration of an alternative embodiment of the system displayed in FIG. 1.

Tender car 11 may be provided with an auxiliary engine 36 that is mechanically connected to an auxiliary generator 38 (shown only in FIG. 2). Auxiliary engine 36 and auxiliary generator 38 may be mounted to a frame 26 that is supported by a plurality of trucks 28. Similar to truck 14, each truck 28 may be configured to engage track 16 via a plurality of wheels 30.

Auxiliary engine 36 may be smaller and have a lower rated output than main engine 20. For example, auxiliary engine 36 may have six to twelve cylinders and a rated power output of about 400-1400 bhp. It should be noted, however, that engines with a different number of cylinders or rated power output may alternatively be utilized, if desired. Similar to main engine 20, auxiliary engine 36 may combust natural gas or another type of gaseous fuel to generate a mechanical output used to rotate auxiliary generator 38. Auxiliary generator 38 may produce an auxiliary supply of electric power directed to one or more of the auxiliary loads 43 (i.e., loads not driven by main engine 20) of consist 13.

Auxiliary generator 38, in addition to providing electric power to auxiliary loads 43 of locomotive 10 or to the other cars of consist 13, may also provide electric power to one or more traction motors 32 on tender car 11, if desired. Similar to traction motors 32 located on locomotive 10, traction motors 32 of tender car 11 may function to propel tender car 11 by rotating wheels 30. In this manner, tender car 11 may be self-propelled and capable of moving about on its own power, independent of locomotive 10 or any other car (when uncoupled from locomotive 10 and the other cars).

Similar to locomotive 10, tender car 11 may generate its own electric energy via dynamic braking via traction motors 32. The generated electric power may be stored at an electric energy storage system 51 onboard tender car 11. Energy stored within system 51 may be selectively provided to traction motors 32 of tender car 11, and/or to any auxiliary load 43 of consist 13.

Auxiliary generator 38 and/or energy storage system 51 of tender car 11 may provide electric power to auxiliary loads 43 on locomotive 10 via an electric conduit 50. With this configuration, main engine 20 may be capable of shutting down or otherwise functioning at a reduced-output level and auxiliary loads 43 may continue to function normally by utilizing power provided by auxiliary generator 38.

Tender car 11 may also include one or more tanks 24 configured to store a liquid fuel (e.g., LNG) for combustion within main engine 20 and auxiliary engine 36. In the disclosed embodiment, a single tank 24 is shown. Tank 24 may be an insulated, single or multi-walled tank configured to store the liquid fuel at low temperatures, such as below about −160° C. Tanks 24 may be integral with frame 18 of tender car 11.

A fuel delivery circuit 55 may supply fuel from tank 24 to main engine 20 on locomotive 10 and to auxiliary engine 36 on tender car 11. Fuel delivery circuit 55 may include, among other things, one or more fuel pumps 44, one or more conduits 48, one or more heat exchangers 46, one or more accumulators (e.g., a main accumulator 52 and an auxiliary accumulator 54), and one or more injectors (not shown) that condition, pressurize or otherwise transport low-temperature liquid fuel, as is known in the art. Fuel delivery circuit 55 may also include one or more regulators 47 that help to regulate flow between main and auxiliary accumulators 52, 54 and engines 20, 36, respectively.

As illustrated in FIGS. 1 and 2, pumps 44 may each be situated near or within tank 24, and embody, for example, cryogenic pumps, piston pumps, centrifugal pumps, or any other pumps that are known in the industry. Pumps 44 may be powered by engines 20 and/or 36. Alternatively, pumps 44 may be powered by electric storage systems 19 and/or 51, if desired. Pumps 44 may pressurize the liquid fuel to an operating pressure of about 5,000 psi, and push the liquid fuel through heat exchangers 46 via conduits 48.

As illustrated in FIG. 1, heat exchangers 46 may have components situated near or within tank 24. Heat exchangers 46 may provide heat sufficient to vaporize the fuel as it is moved by pumps 44. Upon vaporization, the fuel may be transported via conduits 48 to, and stored at, accumulators 52, 54.

Accumulators 52, 54 on locomotive 10 and tender car 11, may be configured to receive pressurized gaseous fuel. Accumulators 52, 54 may embody, for example, compressed gas, membrane/spring, bladder-type, or other suitable accumulators configured to collect pressurized gaseous fuel and discharge the fuel to main engine 20 or auxiliary engine 36 via regulator 47.

Regulators 47 may be configured to selectively allow fluid communication between accumulators 52, 54 and main and auxiliary engines 20, 36, respectively. When regulators 47 open, they may allow gaseous fuel to escape accumulators 52, 54 and flow to main and/or auxiliary engines 20, 36. Regulators 47 may each include a spring-loaded mechanism (not shown) that opens at a predetermined pressure to avoid overpressurization of accumulators 52, 54. Additionally or alternatively, regulators 47 may each include one or more controllable actuators, such as one or more electric solenoids that are operable to open regulator 47 when actuated.

As illustrated in the simplified illustrations of FIGS. 3-6, tender car 11 may simultaneously transport fuel to multiple locomotives 10 of consist 13, in multiple different ways. For example, in FIG. 3, tender car 11 is shown as delivering fuel from a single location on tender car 11 to locomotives 10 at opposing ends of tender car 11. In this embodiment, each main engine 20 is fueled by a separate pump 44 that supplies fuel based on the unique demands each main engine 20 via separate conduits 48.

Figure 4:
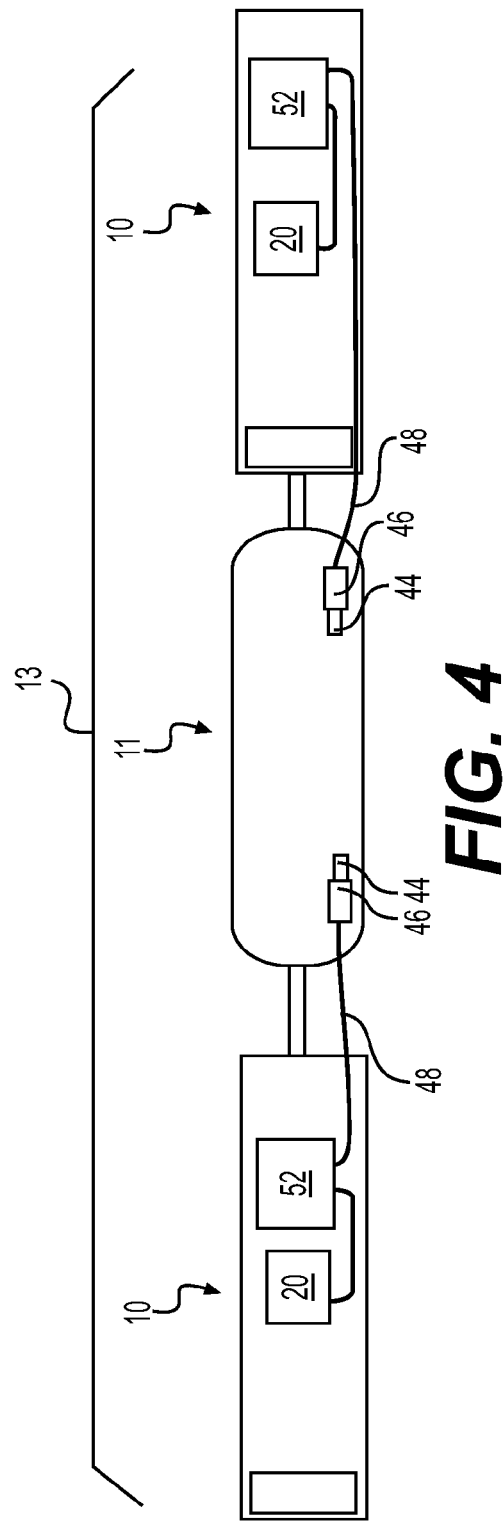
FIG. 4 is a diagrammatic illustration of another alternative embodiment of the system displayed in FIG. 1.

FIG. 4 illustrates another embodiment, wherein tender car 11 includes two pumps 44 delivering fuel through two separate conduits 48 from opposite ends of tender car 11. Locomotives 10 may be configured to receive fuel via conduit 48 from either a front end or a rear end, such that they may be fueled by either fore or aft-coupled tender cars 11.

Figure 5:
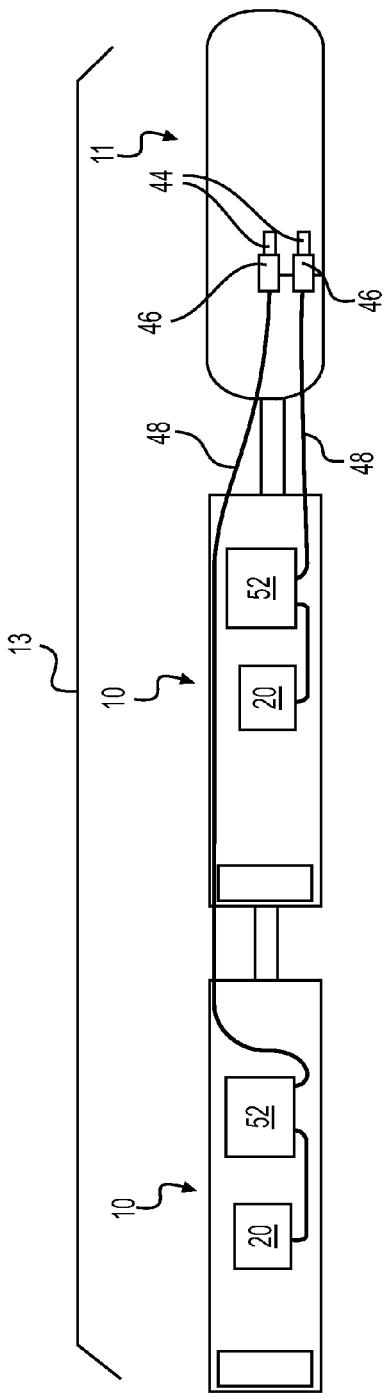
FIG. 5 is a diagrammatic illustration of another alternative embodiment of the system displayed in FIG. 1.

FIG. 5 illustrates another alternative embodiment, in which tender car 11 delivers fuel to two fore-coupled locomotives 10 with two separate pumps 44 located at the same end of tender car 11. In this embodiment, each engine 20 is fueled by a separate pump 44.

Figure 6:
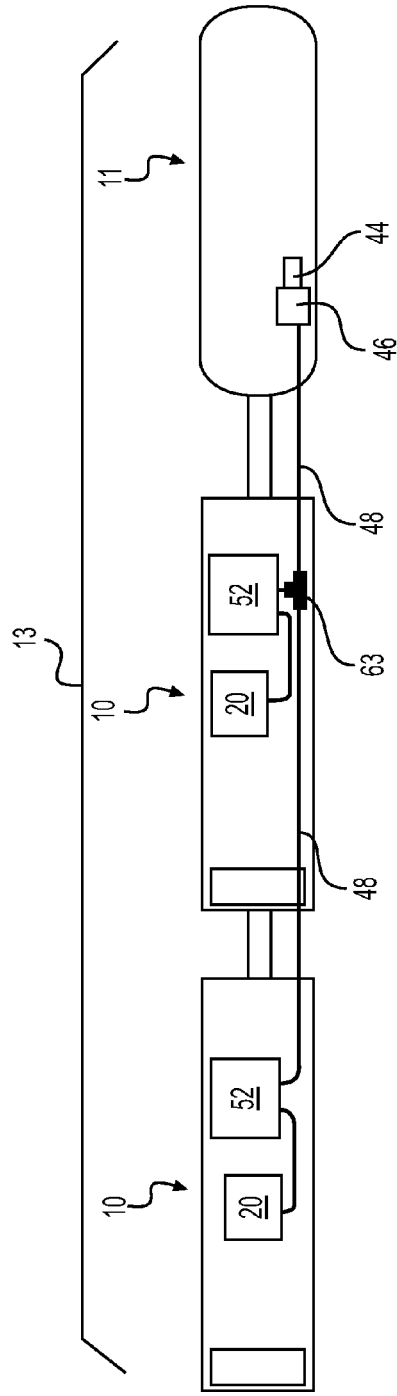
FIG. 6 is a diagrammatic illustration of another alternative embodiment of the system displayed in FIG. 1.

FIG. 6 illustrates tender car 11 having a single pump 44 in parallel fluid communication with two locomotives 10. In this configuration, a tee 63 may connect branching ends of conduit 48 to two main engines 20.

INDUSTRIAL APPLICABILITY

The disclosed power system may be applicable to any consist 13 utilizing a low-temperature liquid fuel. The disclosed system may enhance power capacity of consist 13 by enabling main generator 21 to focus primarily on propelling tasks. Specifically, tender car 11 may attend to its own electric power needs by saving and utilizing the electric energy that results from dynamic braking. In addition, the electric energy produced via dynamic braking onboard tender car 11 may be saved in electric energy storage system 51, from which other auxiliary loads 43 of consist 13 may be powered. In this manner, the electricity generated by main generator 21 may not be siphoned off by the needs of tender car 11, but instead used to propel consist 13 at a greater speed and/or with greater force.

The disclosed power system may also provide a mechanism for improving fuel efficiency of consist 13. In particular, main engine 20 may be able to shut down when consist 13 is stationary to avoid consuming fuel unnecessarily. In this situation, auxiliary generator 38 of tender car 11 may provide the electric power required to run auxiliary loads 43. By keeping the much smaller auxiliary engine 36 instead of the main engine 20 running, significant amounts of fuel may be conserved.

It will be apparent to those skilled in the art that various modifications and variations can be made to the disclosed system without departing from the scope of the disclosure. Other embodiments of the system will be apparent to those skilled in the art from consideration of the specification and practice of the system disclosed herein. It is intended that the specification and examples be considered as exemplary only, with a true scope of the disclosure being indicated by the following claims and their equivalents.

What is claimed is:

1. A consist power system, comprising:
a main engine located onboard a locomotive of a consist;
a main generator driven by the main engine to produce a main supply of electric power;
a traction motor configured to receive the main supply of electric power and propel the locomotive;
an auxiliary engine located onboard a tender car towed by the locomotive;
an auxiliary generator driven by the auxiliary engine to generate an auxiliary supply of power directed to the locomotive; and
a switch mounted on the locomotive, the switch being configured to operate alternatively between three options of:
connecting the main generator to both the traction motor and an auxiliary load on the locomotive,
connecting the main generator to only the traction motor, and
connecting the main generator to only the auxiliary load on the locomotive.

2. The consist power system of claim 1, further including a common fuel supply configured to provide fuel to the main engine and to the auxiliary engine.

3. The consist power system of claim 1, further including a tender car traction motor configured to propel the tender car, wherein dynamic braking of the tender car traction motor provides an additional source of power to the locomotive.

4. The consist power system of claim 3, further including an energy storage system in communication with at least one of the main engine and the auxiliary engine.

5. The consist power system of claim 4, wherein dynamic braking of the tender car traction motor charges the energy storage system.

6. The consist power system of claim 5, further including a resistance grid located on the tender car and configured to dissipate excess energy generated from dynamic braking of the tender car traction motor.

7. The consist power system of claim 4, further including a conduit configured to direct power from the energy storage system to auxiliary loads on the locomotive.

8. The consist power system of claim 4, wherein when power from the energy storage system is directed auxiliary loads on the locomotive, an output of the main engine is reduced.

9. The consist power system of claim 1, wherein the switch is configured to interrupt the main supply of electric power from the main generator to the auxiliary load when the auxiliary load receives electric power from the tender car.

10. A method of providing power to a consist, comprising:
driving a main generator with a main engine located onboard a locomotive of the consist to produce a main supply of electric power;
directing the main supply of electric power from the main generator onboard the locomotive to each of the following three options in the alternative:
only to a traction motor to propel the locomotive;
to both the traction motor to propel the locomotive and an auxiliary load on the locomotive; and
to only the auxiliary load on the locomotive;
driving an auxiliary generator with an auxiliary engine located onboard a tender car towed by the locomotive to produce an auxiliary supply of electric power; and
directing the auxiliary supply of electric power to auxiliary loads of the consist.

11. The method of claim 10, further including operating traction motors on the tender car to produce electric power directed to the auxiliary loads.

12. The method of claim 11, further including storing the electric power generated by the traction motors for future use.

13. The method of claim 12, further including directing excess electric power produced by the traction motors to electric grids positioned on the tender car.

14. The method of claim 10, further including distributing fuel from a common supply to the main engine and the auxiliary engine.

15. The method of claim 10, further including selectively directing electric power from the tender car to the locomotive.

16. The method of claim 10, further including directing electric power from the tender car to an auxiliary load on the tender car.

17. The method of claim 10, further including regulating the supply of electric power from the main generator to the auxiliary load.

18. The method of claim 17, further including redirecting electric power produced by the main generator from the auxiliary load to the traction motor upon connection of an external power source to the auxiliary load.

19. A train consist, comprising:
a locomotive, having:
a frame;
a main engine mounted to the frame;
a plurality of wheels configured to support the frame and driven by the main engine;
a main generator driven by the main engine to generate a main supply of electric power; and
at least one traction motor configured to receive the main supply of electric power and propel the locomotive; and
a tender car, having:
a tank configured to store fuel;
an auxiliary engine;
a fuel delivery circuit connected to the tank, the auxiliary engine, and the main engine;
an auxiliary generator powered by the auxiliary engine to generate a supply of auxiliary electric power;
a conduit configured to deliver the supply of electric power from the tender car to auxiliary loads of the locomotive; and
a switch mounted on the locomotive, the switch being configured to operate alternatively between the three options of:
connecting the main generator to both the at least one traction motor and an auxiliary load on the locomotive,
connecting the main generator to only the at least one traction motor, and
connecting the main generator to only the auxiliary load on the locomotive.

* * * * *